(12) United States Patent
Lauer (10) Patent No.: US 6,249,349 B1
(45) Date of Patent: Jun. 19, 2001

(54) MICROSCOPE GENERATING A THREE-DIMENSIONAL REPRESENTATION OF AN OBJECT

(76) Inventor: Vincent Lauer, 1 Villa de Beauté, Nogent (FR), 94130

( * ) Notice: Subject to any disclaimer, the term of this patent is extended or adjusted under 35 U.S.C. 154(b) by 0 days.

(21) Appl. No.: 09/254,869

(22) PCT Filed: Sep. 26, 1997

(86) PCT No.: PCT/FR97/01695

§ 371 Date: Aug. 16, 1999

§ 102(e) Date: Aug. 16, 1999

(87) PCT Pub. No.: WO98/13715

PCT Pub. Date: Apr. 2, 1998

(30) Foreign Application Priority Data

Sep. 27, 1996 (FR) .................................................. 96 11773
Dec. 12, 1996 (FR) .................................................. 96 15255
Jun. 17, 1997 (FR) .................................................. 97 07469

(51) Int. Cl.$^7$ .............................. G01B 9/02; G02B 21/00
(52) U.S. Cl. ........................................... 356/450; 359/370
(58) Field of Search .................................. 356/345, 347, 356/348; 359/370

(56) References Cited

U.S. PATENT DOCUMENTS

| | | |
|---|---|---|
| 4,869,593 | 9/1989 | Biegen . |
| 5,042,949 | 8/1991 | Greenberg . |
| 5,633,714 * | 5/1997 | Nyyssonen ........................... 356/359 |

OTHER PUBLICATIONS

Waleed S. Haddad & al.: "Fourier-transform holographic microscope", Applied Optics vol. 31 No. 24 pp. 4973–4978, Aug. 20, 1992, Optical Society of America, United States.

Gennady N. Vishnyakov & Gennady G. Levin: "Interferometric computed-microtomography of 3D phase objects", SPIE proceedings vol. 2984 pp. 64–71, Apr. 1997, SPIE, United States.

Paul Woodford, Terry Turpin & al., " The Synthetic Aperture Microscope, experimental results" , SPIE proceedings vol. 2751 pp. 230–240, Jun. 1996, SPIE, United States.

Terry Turpin & al: "Theory of the Synthetic Aperture Microscope", SPIE proceedings vol. 2566, pp. 230–240, Aug. 1995, SPIE, United States.

TongZhang & Ichirou Yamaguchi: "Three-dimensional microscopy with phase-shifting digital holography", Optics Letters vol. 23 no 15 pp. 1221–1223, Aug. 1, 1998, Optical Society of America, United States.

W. Martienssen & S. Spiller, "Holographic reconstruction without granulation", Physics Letters vol. 24A No. 2, pp. 126–127, 1967, Elsevier Science, The Netherlands.

D.H.Close: "High-resolution portable Holocamera", Applied Optics vol. 11 No. 2 pp. 376–383, 1972, Optical Society of America, United States.

* cited by examiner

Primary Examiner—Frank G. Font
Assistant Examiner—Phil Natividad (57) ABSTRACT

The invention concerns a microscope comprising an optical part for generating interference figures between a reference light wave and a light wave diffracted by the observed object, sensors for digitising these interference figures, actuators for operating the optical system, and a computer for receiving the digitised interference figures, controlling the actuators, and provided with a memory and computing means for computing the three dimensional images from the interference figures, based on a principle analogous to holography. The optical part enables the recording on a sensing surface (116) interference figures generated by a reference beam (Fr) and a beam (Fe) passing through a sample (109). The interference figures can differ from one another by the reference wave phase controlled by the piezoelectric actuator (120) or the spatial distribution of the illuminating beam controlled by the positioning device (106). This microscope can be used in biology or metrology.

5 Claims, 5 Drawing Sheets

MICROSCOPE GENERATING A THREE-DIMENSIONAL REPRESENTATION OF AN OBJECT

CROSS-REFERENCE TO RELATED APPLICATIONS

| | |
|---|---|
| PCT/FR97/01695 | 26th of september, 1997 |
| FR 96/11773 | 27th of september, 1996 |
| FR 96/15255 | 12th of december, 1996 |
| FR 97/07469 | 17th of june, 1997 |

BACKGROUND-FIELD OF THE INVENTION

The present invention relates to an optical microscope, which generates a three-dimensional representation of the observed object, using a method derived from digital holography.

BACKGROUND-DESCRIPTION OF PRIOR ART

One method for fast recording of a 3D image of an object is holographic microscopy. This method is described, for example, in the article "Holographic Microscopy", by M.Pluta, published in 1987 in volume 10 of "Advances in Optical and Electron Microscopy", Academic Press, London.

Microscopes have been constructed that use CCD photodetectors instead of a special holographic paper to detect the interference pattern, and render possible the digital reconstruction of an image by simulating the analog process of holographic microscopy. Such microscopes are described in: "Three dimensional imaging of cells through digital holographic microscopy", Beltrame F. & al., Proceedings of the ISMII '84: IEEE computer society international symposium on medical images and icons, 24–27 juillet 84, Arlington, U.S., pages 232–235, XP002056887. "Fourier-transform holographic microscope", Waleed S. Haddad & al., applied optics vol. 31 no 24 p.4973, 20/8/92 "Study of Biological Samples with a Laser Fourier Holographic Microscope", Karpov V. B., Laser Physics vol.4 no 3 juin 1994.

These microscopes do not use a microscope objective to generate the interference pattern. The wave scattered by the object travels through empty space to a receiving surface where it interferes with the reference wave. The interference pattern produced that way can eventually be enlargened by a microscope objective like in Beltrame's article. Because the light scattered by the object does not pass through a microscope objective before it interferes with the reference wave, the digital holographic reconstruction of the object can be based on reverse light propagation in free space.

Microscopes in which ones the wave scattered by the object passes through a lens system element before it interferes with the reference wave have also been designed. Examples of such microscopes are: "Interferometric computed-microtomography of 3D phase objects", Gennady N. Vishnyakov & Gennady G. Levin, SPIE proceedings vol.2984 p.64, mars 95 "The Synthetic Aperture Microscope, experimental results", Terry Turpin, Paul Woodford & al., SPIE proceedings vol.2751 p.230, juin 96.

In these two documents, there is an intermediate step of the image acquisition which consists in measuring the wave scattered by the observed sample and reaching the receiving surface, for a given light beam illuminating the object. This yields a bidimensional image. However, in these two documents, no three-dimensional representation is directly obtained from the value of the wave on the receiving surface. Instead, a three-dimensional representation can only be obtained from a series of bidimensional images, each of these being obtained for a different direction of the illuminating beam.

The microscopes described by Vishnyakov and by Turpin differ from the microscopes described by Karpov, by Beltrame and by Haddad, by the fact that they use a microscope objective or an equivalent device, which modifies the wave originating from the object before it interferes with the reference wave. Such a configuration makes the digital reconstruction difficult, because the propagation of the optical wave is no more described by the simple law of propagation in empty space. The specific properties of the microscope objective must be taken into account to generate the representation of the light wave present in the object. This implies that a precise knowledge must exist of the correspondance between the wave as it is recorded on the receiving surface, and the wave as it is when it leaves the observed sample, before entering the microscope objective. This presents some notable difficulties. For example Turpin writes that the samples are equally spaced angularly on the surface, which is not true.

This is why the microscopes described by Vishnyakov and by Turpin only generate bidimensional representations from each wave measured on the receiving surface. In the case of Turpin's microscope, this is equivalent to assimilating a portion of a sphere to a portion of a plane. These microscopes can compute three-dimensional images only by recombining several of these bidimensional representations.

This is also why Karpov, Beltrame, and Haddad, who achieved numerical three-dimensional reconstructions of the wave present in the object for a given illumination beam, always avoided the use of a microscope objective to collect the scattered wave before it interferes with the reference wave.

A further insight into the difficulties of three-dimensional reconstruction of the wave present in the object for a given illumination beam, when a microscope objective is used to collect the scattered wave before it interferes with the reference wave, is given by: "Three-dimensional microscopy with phase-shifting digital holography", Tong Zhang & Ichirou Yamaguchi, optics letters vol.23 no 15 p.1221, Aug. 1, 1998.

In this document, the authors generate a three-dimensional representation, and uses a microscope objective to collect the scattered wave before it interferes with the reference wave. The three-dimensional representation generated is a set of two-dimensional images that are optically formed in the image space of the microscope objective, in a series of planes including the receiving surface. Between the receiving surface and any of these planes, the light travels through free space. Reconstruction can therefore be made according to the laws of propagation in free space. However, the three-dimensional reconstruction obtained is not a three-dimensional reconstruction of the optical wave in the object, but a three-dimensional reconstruction of the optical wave in the image space of the microscope objective. It is known, from the theory of light propagation (incompatibility of Abbe and Herschel's conditions), that only one plane (the image plane for which the objective is designed, usually 160 mm from the objective shoulder) in the image space of the microscope objective is the exact enlarged image of a plane of the observed object. The other planes in the image space of the microscope objective are not exact images of object space planes, and therefore there is no simple relation between the three-dimensional image reconstructed by this microscope and a three-dimensional representation of the light wave in the object. This author, who clearly attempted to reconstruct the object from a single record of the optical wave scattered by it, and who used a microscope objective to collect this wave before letting it it interfere with a reference wave, failed in generating a valid three-dimensional representation of the object, because he did not consider the possibility to reconstruct the image taking into account the properties of the objective rather than using propagation in free space.

Other interferometric microscopes exist, that use a microscope objective to collect a wave scattered by the object, and let it later interfere with a reference wave. With these devices, the image is observed directly in a plane, which is the geometric image of the object, with at least one of the beams passing through the object. These devices produce two-dimensional images similar to those produced with standard microscopes, but the variations of light intensity on the image do not represent the sample's absorptivity, but the interference between the two beams in a plane which is an image of the object. These devices do not allow the generation of a three-dimensional image. They are described, for example, in chapter III of the book "*Progress in Microscopy*", by M. Francon, published in 1961 by Pergamon Press, Oxford, Great Britain.

A specific application of interferometric microscopy is surface profiling, as described for example in the patent U.S. Pat. No. 5 042 949. In surface profilers, a two-dimensional array giving a surface height at each point of the array is generated. This differs from a three-dimensional representation, in which all points of space (not only points on a surface) are considered.

The representation of the wave in the object as obtained for example by Karpov, by Beltrame, or by Haddad, can be considered a representation of the object itself. But in general, if the object is effectively three-dimensional or if the illuminating wave is not a plane wave, this representation is highly speckled. The authors who obtained such representations used plane illuminating waves and plane objects, hence avoiding this problem. A similar problem was found in analog reconstruction of holograms and a solution was proposed in: "*Holographic reconstruction without granulation*", W. Martienssen & S. Spiller, Physics letters vol.24A no 2, p.126, 1967.

A microscope in which a parallel illuminating beam has a point image on the receiving surface is the one described by Turpin. In this microscope, the light scattered by all illuminated parts of the object reaches the receiving surface. This generates aliasing, and this aliasing can only be disminished, in this microscope, by reducing the size of the illuminated area of the object.

SUMMARY OF THE INVENTION

The present invention is a system that renders it possible to obtain a three dimensional representation of an observed object, and a complete representation of the wave diffracted by this object when using different light settings, in a digital form allowing later display or analysis of any kind. This system includes an optical part, allowing the generation of interference patterns between a reference optical wave and an optical wave which has been diffracted by the observed object; sensors for digitizing these interference patterns; actuators for acting on the optical system; and a computer which receives the digitized interference patterns, controls the actuators, and has memory and calculation means for computing three-dimensional images from the interference patterns.

One method allowing reconstruction of the wavefront in the observed object is to let it interfere with a reference wave, according to the principle of holography. After recording the interference pattern, the computer can perform a digital reconstruction equivalent to the optical reconstruction used in holography. But the digital recording of a hologram is generally impossible due to the fact that the variations of the intensity of light appear on characteristic distances of about a wavelength, much shorter than the sampling period of existing optoelectronic detectors. According to the present invention, the reference wave used is approximately spherical and is centered, truly or virtually, on a point close to the observed part of the object. This allows the generation of interference patterns in which the intensity variations have larger characteristic distances, which in turn allows the digital recording of the interference patterns and a digital reconstruction equivalent to the optical reconstruction.

The direct computation of the optical wave present within the object, using a method simulating holographic reconstruction, leads to the general defaults of holography: a twin image which is symmetrical to the real image in relation to the point of origin of the reference wave, and second order errors affecting the value of the wave. According to an advantageous embodiment of the invention, the system computes the complex value (amplitude and phase) of the wave diffracted by the object which reaches the reception surface. This allows the computation of the light wave present in the object by directly applying the principle of inverse scattering, without the approximations of holography. According to an advantageous embodiment of the invention, this value is computed from several interference patterns that differ from one another by the phase difference between the reference wave and the wave illuminating the object. According to an advantageous embodiment of the invention, this value is computed from three interference patterns that are successively formed by performing 120-degree phase shifts between the wave illuminating the object and the reference wave. The optical wave originating from the object alone is then computed from these three intensity records using a simple linear formula.

The interference pattern produced can be directly recorded by sensing devices placed close to the object, or by adding optical elements, which modify the wavefront between the object and the receiving surface. According to an advantageous embodiment of the invention, an enlarged intermediate image of the object is formed using a microscope objective. This method allows spatial filtering of the intermediate image through a diaphragm, the aperture of which determines the size of the observed part of the object. The size (in pixels) of the necessary photodetectors is reduced by reducing the size of the observed image. A system of lenses placed after the diaphragm and appropriately dimensioned allows the formation of the interference pattern on a photosensor. The reference wave can be recombined with the wave emanating from the object by placing a beamsplitter on the path of the light emanating from the object.

It is possible, from the complex representation of the optical wave originating from the object and reaching the detector surface, to obtain a three dimensional representation of the optical wave in the object, by computing it point-by-point, applying the principle of inverse scattering. The point-by-point computation on a sufficiently large area of the object would demand much too long a computation time. According to an advantageous embodiment of the invention, and in order to perform this computation within a reasonable computation time, the frequency representation of the wavefront is generated and a three-dimensional inverse fast Fourier transform is used to compute a classical three-dimensional representation. The calculation may be performed by a processor, but it is also possible, in order to make the computation faster, to incorporate dedicated devices like FFT processors (specialized in computing the fast Fourier transform), or dedicated Asics.

According to a very advantageous embodiment of the invention, the optical system is such that when a plane wave leaves the object, it produces a point image on the photodetector in the absence of the reference wave. This renders it possible to directly obtain a frequency representation of the wave originating from the object. Each point of the photodetector represents a single frequency, that is, a single wave vector, of the optical wave originating from the object.

The three-dimensional representation which is obtained is a complex valued function of the three spatial coordinates, corresponding to the optical vibration at each point of the object. The result depends strongly on the illumination method. It is possible to use a spatially coherent parallel illumination beam. The representation obtained in this way is very precise in a plane orthogonal to the direction of the illuminating beam, but has defects in the direction parallel to this beam. According to an advantageous embodiment of the invention, the spatial coherence of the illumination beam used is broken, which means that the object is illuminated, at each point, from all directions. This light setting is achieved with a condenser, which forms, in the plane of the object, the image of a scattering element illuminated by the laser beam. But the representation obtained is highly speckled due to the time coherence of the optical illumination wave. This phenomenon, called Speckle, is a known problem in holographic microscopy. According to an advantageous embodiment of the invention, the representation of the object is improved by using the wave scattered by the object under several distinct light settings. For example, it is possible to use several representations, obtained by slightly displacing the difflusing element between each image. It is then possible to average, for each point, the intensity of all the obtained representations. A satisfying spatial representation of the object may then be obtained.

From this representation, it is possible to generate any kind of image in two dimensions: sections, projections, etc.

BEST MODE OF CARRYING OUT THE INVENTION

Figure 1:
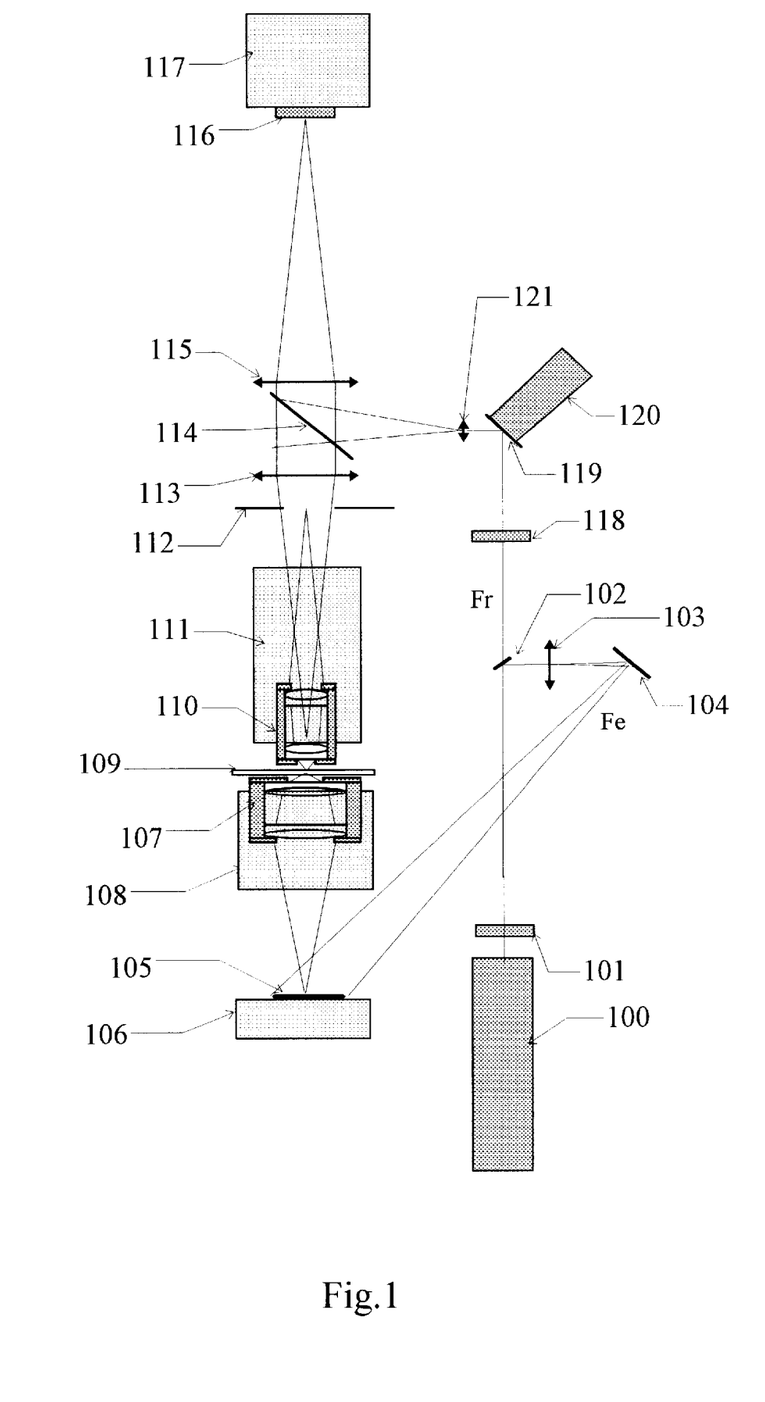
FIG. 1 depicts the preferred embodiment of the invention.

A laser (100) produces a beam, which passes through a filter (101) and is split into an illumination beam (Fe) and a reference beam (Fr) by a beamsplitter (102).

The illumination beam passes through a lens (103), is reflected by a mirror (104), and reaches a scattering element (105). This scattering element is fixed to a motorized, two-axis positioner (106), which can move it within a plane orthogonal to the optical axis of the objective (110). The beam scattered by (105) passes through a condenser (107), which forms an image of (105) in the plane of the object (109). This condenser is fixed to a single-axis manual positioner (108), which can shift it in the direction of its optical axis. The focal length of the lens (103) must be chosen so that the area of (105) illuminated by the beam is large enough to allow its image, formed by the condenser, to cover at least the entire observed area.

The wave originating from the object (109) passes through the microscope objective (110). This objective is a plane objective (that is, an objective which generates a plane image of a plane object), with a large aperture (1.25, for example), working in immersion, and forming an enlarged image of the object at a finite distance. This microscope objective is mounted on a focusing stage (111).

Within the plane in which the objective normally forms the image of the observed object, a diaphragm (112) is interposed, which spatially filters the image. Behind this plane, there is an achromat (113), the object focal plane of which must coincide with the image focal plane of the objective (110). A second achromat (115) has its image focal plane in the plane of a CCD receiver (116) and forms, in the plane of that CCD, an image of the image focal plane of the objective (110). The CCD (116) is connected to a camera (117), which outputs an analog video signal.

The reference beam first passes through a filter (118), then is reflected by a mirror (119) mounted on the moving end of a piezoelectric transducer (120). It then passes through a lens (121) which focuses the beam on one point. The divergent beam originating from that point is partly reflected by the beamsplitter (114), which superimposes it on the beam originating from the object, and allows the recording of the resulting interference pattern on the CCD (116). The focusing point of the beam originating from the lens (121), after having been reflected on the beamsplitter (114), must have its virtual image at the center of the image of the diaphragm (112) by the achromat (113). The piezoelectric transducer (120) renders it possible to modulate the phase of the reference beam. The plane of the object must be horizontal so that the optical oil, needed to use the immersion objective and condenser, does not leak. The optical axis of the system is therefore vertical.

The camera (117) is mounted on a three-axis translation positioner. The laser beam (100) is mounted on a tilting positioner which allows the adjustment of its direction. The piezoelectric transducer (120) is mounted on a positioner which allows the adjustment of the direction of an axis orthogonal to the mirror (119) and the joint translation of the elements (119) (120) along this axis. The mirror (104) is mounted on a positioner allowing the adjustment of the direction of an axis perpendicular to this mirror. The adjustment of these positioners is normally done once and for all, and in a version of the system manufactured in large series, these positioners could be suppressed, and replaced by a more precise manufacturing method. But in this embodiment, designed for small series, the easiest solution is to use normal positioners. These positioners are known systems frequently used in optical prototyping, and may be found in the catalogues of Melles Griot or Physik Instrument.

Figure 5:
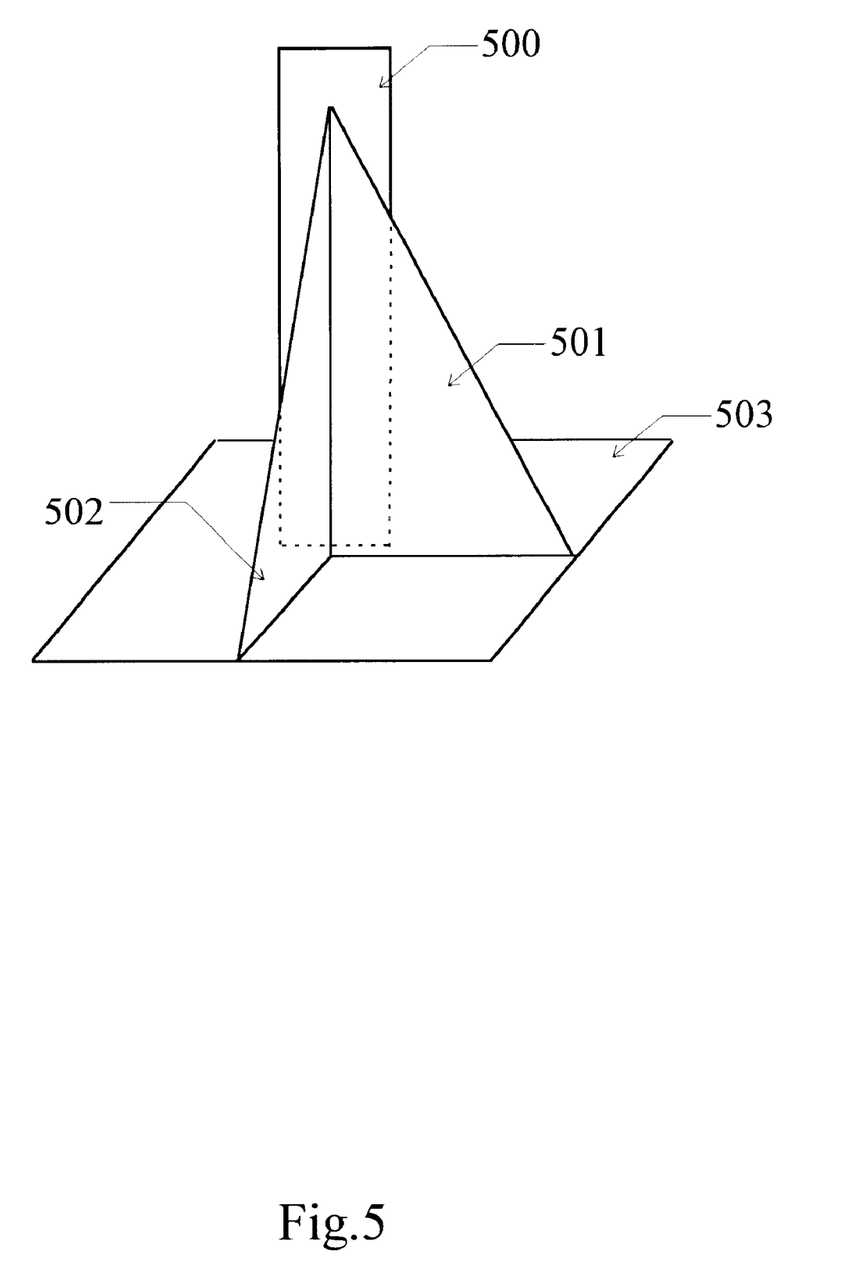
FIG. 5 depicts a mechanical support, which renders it possible to keep the whole system vertical.

The whole system is mounted on a plate (500), on the side facing away in FIG.5. That plate is fixed to two triangular plates (501) (502) that are themselves fixed to a square base (503). Plates (500)(501)(502)(503) are made of a rigid aluminium alloy AU4G which can, for example, be 20 mm thick. The plates can be fixed to each other using enough threaded holes and screws to make the system perfectly rigid. The whole system lays on an antivibration support made, for example, of a granite slab laying on truck inner tubes that dampen vibrations. The mounting of all parts, especially mirrors and beamsplitters, on the plate (500), must be realized so as to maximize rigidity. All the usual precautions must be taken to avoid vibrations.

Figure 2:
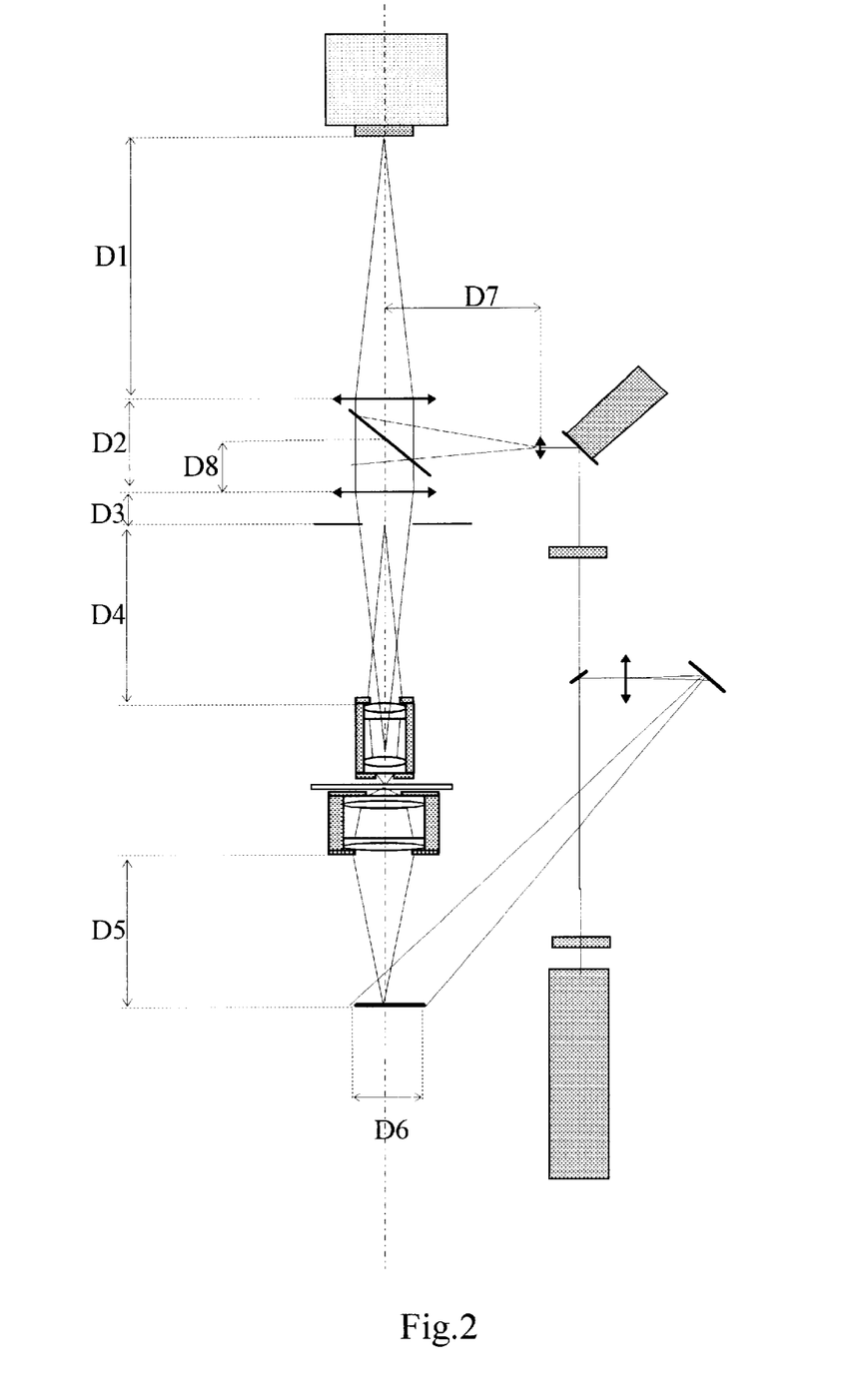
FIG. 2 gives an example of dimensions for this embodiment.

The following details concern an example of specific dimensions for the system. The condenser (107) is a bright-ground immersion condenser with aperture size 1.2, the aperture diaphragm of which has a diameter of 28 mm when open. The illuminated area of the scattering element has a diameter D6 of about 1 cm. The distance D5 between that scattering element and the condenser is 100 mm. The microscope objective is a plane objective of magnification ×100 and aperture 1.25 with a focal length of about 1.8 mm, forming the image at 160 mm from the objective shoulder. The distance D4 between the objective shoulder and the diaphragm is 160 mm. The distance D3 between the diaphragm (112) and the achromat (113) is 20 mm. The achromat (113) has a focal length of 200 mm and a diameter of 30 mm, and its most steeply curved face is facing the beamsplitter (114). The achromat (115) has the same characteristics, and its most steeply curved face is also facing the beamsplitter (114). The distance D2 between the two achromats is 85 mm, leaving space for a sufficiently large beamsplitter (114). The distance between achromat (115) and CCD (116) is 200 mm. The lens (121) has a diameter of 4 mm and a focal length of 6 mm. The distance D7 between that lens and the optical axis is about 70 mm. The distance D8 between the achromat (112) and the center of the beamsplitter (114), on the optical axis, is about 45 mm. The laser is an Helium Neon laser operating at 633 nm with random polarization, with 0.5 mW power output, and with a beam diameter of 0.47 mm. The CCD photosensor has square pixels, the surface of a pixel being about 8.5×8.5 micrometers. The camera outputs a CCIR video signal and a pixel clock. The piezoelectric positioner (122) is a cylindrical piezoelectric stack, with a fixed body and a moving end with a linear travel of about 15 micrometers for an applied voltage of 100 Volts.

The computing system is, for example, a PC computer with appropriate acquisition and command cards, and eventually some extra means of calculation. The video acquisition card works in real time, digitizes the signal on 8 bits and acquires images of size 512×512 pixels sampled by the pixel clock, therefore corresponding exactly to the CCD pixels. The piezoelectric positioner is directly driven by a digital-to-analog converter card which outputs a signal between, for example, zero and $V_{max}$, with for example $V_{max}$=10 volts. An RC filter with a time constant of about 0.1 ms is placed between the converter's output and the piezoelectric transducer's connectors. The positioner (106) is motorized by stepper motors also driven by the computer. The computer will move it along the two axes by steps of 0.2 mm, for example.

Figure 3:
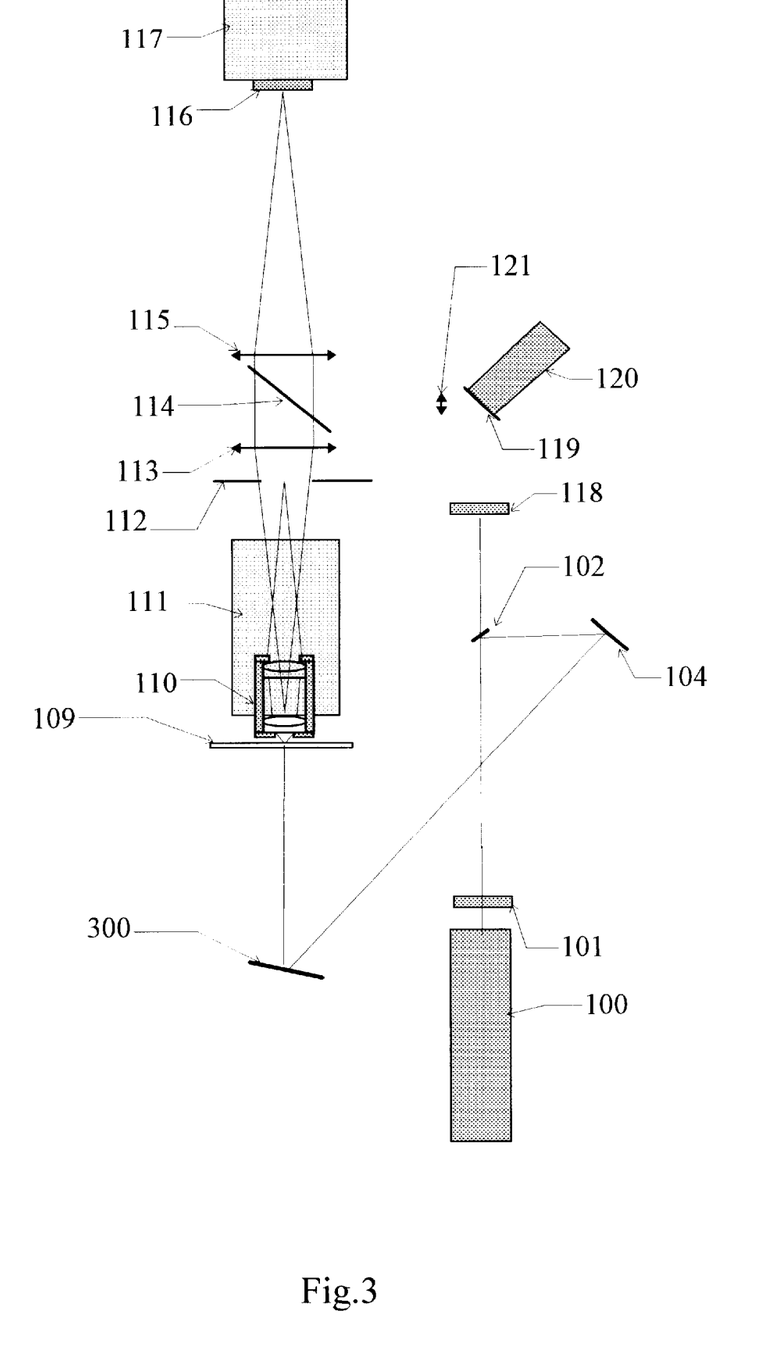
FIG. 3 depicts a specific configuration used during the adjustment process for this embodiment.

In order to precisely adjust the position of camera (117), the reference beam is suppressed and the normal illumination system is replaced by a coherent beam parallel to the optical axis. This is done as indicated in FIG. 3, by suppressing (103) (105) (106) (107) (108), introducing a mirror (300) reflecting the beam towards the objective, and using a fully opaque element as filter (118). The mirror (300) is mounted on an angular positioner which must be adjusted so as to reflect the beam toward the entry of the objective (110) and to maximize the intensity of the image received on (116). The position of (116) is then adjusted in the direction of the optical axis in such a way that the image received on the sensor (116) is a point. It is then adjusted in the plane orthogonal to the optical axis, in such a way as to position this point at the center of the area of interest, 512×512 pixels in size, which will be used for computation. For this kind of operation, the image received on the sensor (116) can be displayed in real time on the computer screen.

The reference beam must then be restored, and the beam originating from the object must be suppressed by placing a blinder behind the objective (110). The direction of the laser (100) must be adjusted so as to direct the beam towards the center of the mirror (120). The joint position of (119)(120) must be adjusted so that the beam originating from (120) actually passes through the lens (121). These adjustments can be easily controlled using a sheet of paper, which scatters light. The joint position of (119)(120) must be further adjusted so as to illuminate the CCD (116) as intensely and as regularly as possible.

The reference beam must then be suppressed again, and the beam originating from the object must be used again, the object used being a transparent slide. The position of (104) must be adjusted to direct the beam toward the scattering element (105), and then more finely adjusted to center the image obtained on sensor (116). The positioner (108) must be adjusted so that the image received on the photosensor, which represents the frequencies originating from the object, is a bright, speckled disk as large as possible. When replacing the observed object, it can be necessary to modify the position of (108), but the position of (104) should be fixed once and for all.

During the preceding operations, the optical density values of filters (101) and (118) must be constantly modified in order to have the most easily observable beam when observed directly with the eye, or in order to achieve optimal lighting of (116) when the image received on (116) is displayed on the screen. The automatic gain control of the camera can be used advantageously.

As part of the normal use of the microscope, the optical density values of filters (101) and (118) must be chosen so that the reference beam and the beam originating from the object have about the same intensities when reaching the CCD sensor, and so that the resulting interference pattern is as intense as possible without exceeding the maximum value permitted by the camera or the analog-to-digital converter card.

The command voltage of the piezoelectric actuator must be calibrated. To perform that calibration, the voltage difference ΔV corresponding to a 360-degree phase shift of the reference beam is determined. This is done using a transparent slide as a sample, the reference wave and the wave originating from the object both being present. If we note p the precision with which we wish to obtain the result (for example, p=0.01 Volts) the computer then performs, for an index i varying from 0 to $$\frac{V_{max}}{p},$$

application of zero voltage to the actuator
pause (10 ms)
acquisition of the interference pattern
application of voltage $V_i$=i. p to the actuator
pause (10 ms)

acquisition of the interference pattern application of $V_{max}$ voltage to the actuator calculation of the correlation between the two interference patterns storage of the result in the array Corr[i]

The array Corr[i] then contains the correlation between the interference patterns obtained for the voltages $V_i$=i. p and the one which is obtained for zero voltage. The computer then performs an adequate low-pass filtering on the contents of that array in order to eliminate noise. Then it computes the average value M of Corr[i] and the values of i that verify the conditions Corr[i]≦M and Corr[i+1]≧M. It computes the difference d between two consecutive values of i that verify that condition. The voltage ΔV is then ΔV=p.d.

During normal operation of the microscope, the light setting is modified by using the positioner (106) to shift the scattering element (105). Each position generates a different light setting. For each light setting, the computer computes the complex value (that is, the complex number representing phase and intensity) of the optical wave at each point of the object. The final image of the object is computed by averaging the intensities obtained from a sufficient number of distinct light settings. The intensity of the wave at a given point is the square of the absolute value of the corresponding complex number.

To obtain the complex value of the optical wave at each point of the object, the computer first computes the complex value of the optical wave originating from the object which reaches each point of the CCD sensor. This value is computed from the records of three interference patterns formed on the sensor, with a 120-degree phase shift performed between each of these figures. Let I(P,θ) be the intensity, on a point P of the sensor, of the interference pattern produced by the wave originating from the object and the reference wave, for a phase shift θ radians of the reference wave. Let $I_{ref}$(P) be the intensity of the reference wave on that point of the sensor. The complex value of the optical wave originating from the object and received on pixel P of the CCD sensor is then:

$$S(P) = \frac{1}{\sqrt{I_{ref}(P)}} \left[ \frac{1}{6}\left(2I(P, 0) - I\left(P, \frac{2\pi}{3}\right) - I\left(P, -\frac{2\pi}{3}\right)\right) + j\frac{1}{2\sqrt{3}}\left(I\left(P, \frac{2\pi}{3}\right) - I\left(P, -\frac{2\pi}{3}\right)\right) \right]$$

Each pixel P of the sensor represents a single frequency of the optical wave in the object. If the coordinates (i,j) (measured in pixels) represent, relative to the central point of the area of interest, a point of the sensor, then the single frequency to which the point (i,j) corresponds, expressed in a coordinate system with a third axis orthogonal to the plane of the sensor, and leaving out a constant factor, is (i,j,k), with k=$\sqrt{K^2-i^2-j^2}$-C, where K is a constant, C is a zero constant, but it can be given a non-zero value so as to shift the frequency representation, which generates a phase modulation of the image, not affecting the final result. The computer uses this formula to generate a three-dimensional frequency representation of the optical wave, and then applies an inverse Fourier transform to obtain the complex representation of the optical wave in the observed object. This implies the following:

The value of the intensity of the reference wave, at each point, is stored in an array of real numbers Iref[i,j], where the origin of the coordinate system (i,j) is the corner of the sensor.

The acquisition of the three phase-shifted images yields an array I of 8 bit integers, of dimensions 3×512×512, in which I[a,i,j] represents the value at the pixel of coordinates (ij) of the interference pattern corresponding to a phase shift of 'a' times 120 degrees, where the origin of the coordinate system (i,j) is the corner of the sensor.

The computer generates the array of complex numbers S [i,j], where i and j vary from 0 to 511, by assigning the following values to the points of the array:

-real part of $S[i, j]$: $\frac{1}{6\sqrt{Iref[i, j]}}(2I[0, i, j] - I[1, i, j] - I[2, i, j])$ -imaginary part of $S[i, j]$: $\frac{1}{2\sqrt{3Iref[i, j]}}(I[1, i, j] - I[2, i, j])$ The computer generates the array of complex numbers H representing frequencies, sized 512×512×512, by initializing it to zero and then performing the following operation for all values of i and j between 0 and 511:

H[i,j,$\sqrt{K^2-(i-256)^2-(j-256)^2}$-C]=S[i,j]

The computer performs the three-dimensional inverse Fourier transform of the array H to obtain the three-dimensional representation of the wave in the observed object, which leads to an array G, sized 512×512×512. If the computation of the three-dimensional inverse Fourier transform is made in the most standard way, a constant in the frequency space produces, in the spatial representation, a Dirac function centered on the point of coordinates (0,0,0) which must be translated to the point of coordinates (256,256,256) to appropriately center the image. The three-dimensional representation of the wave in the observed object is then obtained by generating the array F using:

F[i,j,k]=G[(i+256)%512,(k+256)%512], where the sign % represents the modulus operator. In this three-dimensional representation, the virtual point of origin of the reference wave is at the center, that is, at the point of coordinates (256,256,256).

The inverse three-dimensional transform is a long operation and the computer may in, certain cases, such as focusing, generate a two-dimensional image only. A section in the plane of the object can be generated by performing the two-dimensional inverse Fourier transform of the array S[i,j], which yields the array G1, and by computing the array F1 using F1[i,j]=G1[(i+256)%512,(j+256)%512]. The array F1 is the two-dimensional representation of the optical wave in the plane of the object in which the virtual point of origin is included, and which is perpendicular to the optical axis (sectional view). A section in a plane orthogonal to the preceding one may be obtained by first computing the array S2[i,j], sized 512×512, which is done by zeroing this array and then performing the following operation for all (i,j) values:

S2[i,$\sqrt{K^2-(i-256)^2-(j-256)^2}$-C]+=S[i,j]

(which means, using the conventions of the 'C' computer language: add the complex value of S[i,j] to the complex value of S2[i, $\sqrt{K^2-(i-256)^2-(j-256)^2}$-C] initially present in the array )

The two-dimensional inverse Fourier transform of the array S2 then leads to an array G2, from which the array F2 may be extracted as before using: F2[i,j]=G2[(i+256)%512,(j+256)%512]. The array F2 is the two-dimensional representation of the wave in the plane of the object which includes the virtual point of origin of the reference wave, and which is parallel to the optical axis and to the i axis.

In order to compute K and C, it is first necessary to perform a calibration. This is achieved using an objective micrometer (a scaling with one graduation each 10 micrometers, mounted on a microscope slide ). A two-dimensional image of that micrometer is generated by computing the inverse two-dimensional Fourier transform of the array S[i,j]. The diaphragm (112) is adjusted so that its image is clearly visible at the center of the resulting two-dimensional image. If it is too open, it leaves the observed area and aliasing occurs, which diminishes the image quality. The microscope is focused so as to get the sharpest image possible. The intensity corresponding to the two-dimensional image is averaged on various light settings to diminish the speckling. If the distance between two graduations originally separated by $D_{ree}$ micrometers is $D_{pix}$ pixels on the image obtained, if the average index in the sample is n (generally, n=1,5) and if the laser wavelength is $\lambda$ ($\lambda$=0,633 micrometers) then:

$$K = \frac{512}{D_{pix}} \frac{D_{reel}}{\frac{\lambda}{n}},$$

where $D_{reel}$ and $\lambda$ are expressed using the same unit of measure. The value of C that will be used is then: C=K-511

The normal cycle for using the microscope, also used during the preceding calibration procedure, is the following:

application of zero voltage to the piezoelectric actuator.
pause (10 ms)
application of voltage $$\frac{V_{max}}{2} - \frac{\Delta V}{3}$$

to the piezoelectric actuator.
pause (10 ms)
recording of the first interference pattern
application of voltage $$\frac{V_{max}}{2}$$

to the piezoelectric actuator.
pause (10 ms)
recording of the second interference pattern
application of voltage $$\frac{V_{max}}{2} - \frac{\Delta V}{3}$$

to the piezoelectric actuator.
pause (10 ms)
recording of the third interference pattern
application of voltage $V_{max}$ to the piezoelectric actuator
shift of the positioner (106)
computation of the corresponding optical wave in the object
computation of the optical intensity in the object.

This cycle is repeated $N_{may}$ times. After $N_{may}$ repetitions of the cycle, the program can average, in each point, the intensity values resulting from the $N_{may}$ different light settings, then generate the three-dimensional representation of the object and display a two-dimensional image derived from that representation. It can then repeat the operation. The larger $N_{may}$ is, the more speckling is attenuated. The cycle described above is the simplest, but it can be optimized to take into account the simultaneous photosensor exposure and image transfer. Computation of the optical wave can be performed on the whole object or part of it, such as a section, depending on the available time and computing power. In the simplest case, the computer only generates and displays a section of the object. As indicated above, the positioner (106) is shifted by 0.2 mm steps in both directions. The order in which these shifts are made is not crucial, provided that the $N_{may}$ light settings used to compute the three-dimensional representation of the object are all obtained using distinct positions of the actuator (106), so that the same light setting is not used twice. The use, at each cycle, of the values 0 and $V_{may}$ of the voltage, diminishes the hysteresis in the piezoelectric actuator by always keeping the same cycle.

Before an image can be obtained, the operator must adjust the focusing mechanism of the microscope. If this adjustment is done by hand, it must be done step-by-step, and the operator must take his hand off the focusing mechanism while the image is being acquired, in order to avoid transmitting vibrations. To make that operation easier, it can be useful to motorize the focusing mechanism. Because the computation of a three-dimensional Fourier transform is difficult to carry out in real time, one might as well use, during focusing, a two-dimensional image obtained by directly computing the Fourier transform of the array S[i,j]. It is also possible to compute the two-dimensional Fourier transform of only the central part of the array S[ij], for example a 256×256-point area of this array, which generates an image less sensitive to the focusing precision. However, even during this focusing operation, it is useful to average the intensity of a few images of the resulting two-dimensional representation.

This list of computation methods is not exhaustive. The computer might generate three-dimensional representations representing more-or-less extended portions of an object (sections, projections, several sections on a limited thickness, etc.). It can filter these representations, in order to limit the granular aspect of the image, at the expense of resolution. The algorithm chosen should depend on the needs (the speed of image acquisition and precision, real time or delayed computation) and of the hardware capacities of the computer.

Figure 4:
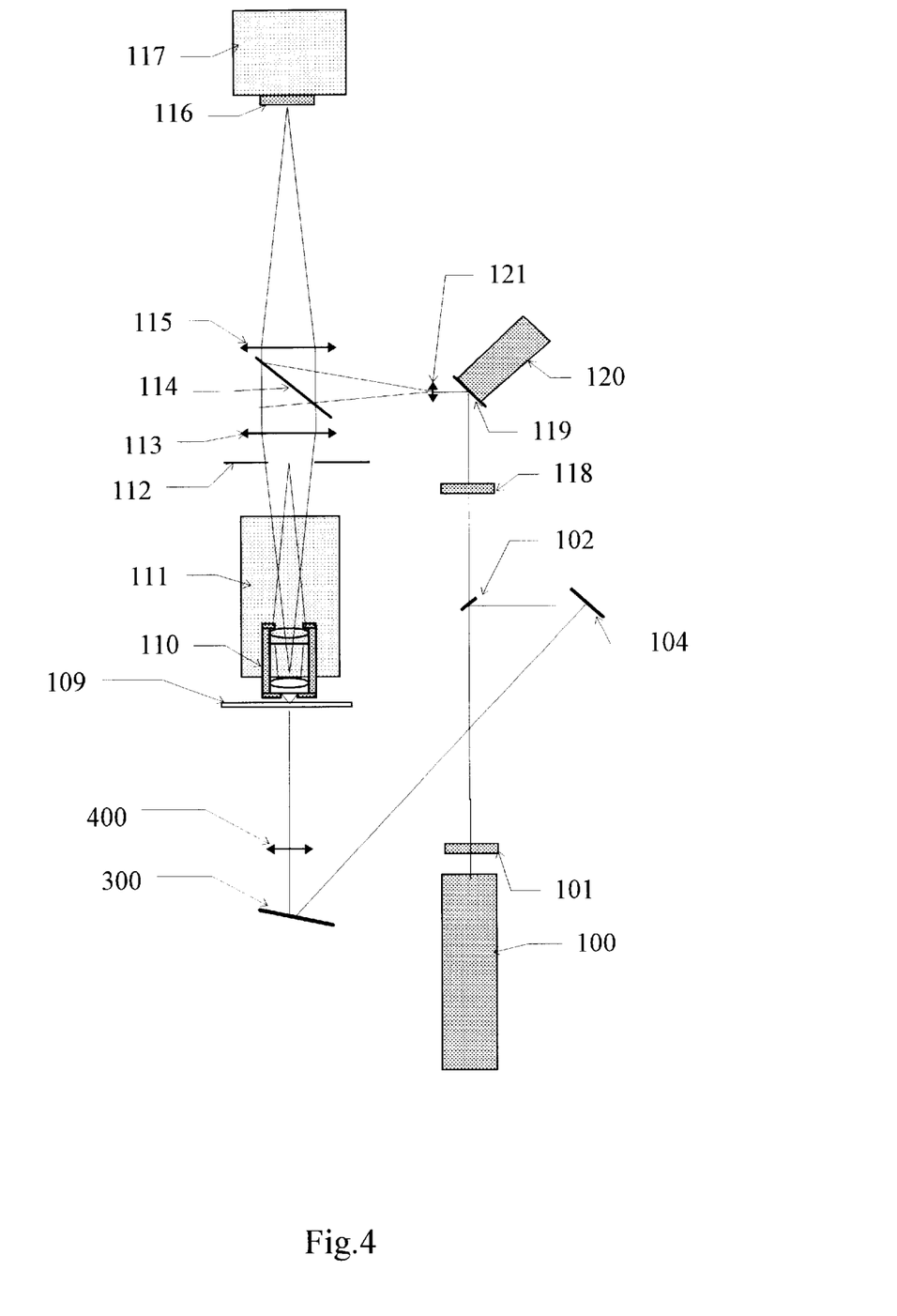
FIG. 4 depicts a variation of this embodiment, which differs from it by a different lighting method.

In a variation of this embodiment, a unidirectional illumination beam is used. This eliminates the need to compute the average intensity of several images, because each point of the object is then illuminated with the same intensity. Because the averageing on intensities is unnecessary, the three-dimensional representation also keeps usable phase information. But the resulting images are precise in three dimensions for specific objects only, such as, sub-micrometric particles embedded in a glass substrate. Generally, the image is very precise in the plane perpendicular to the beam direction and has defaults in the direction of the beam. However, this illumination method can be used in cases when one can do with a two-dimensional image, to make the focusing of the microscope easier, or for specific objects (to localize point defects in glass, for example). This illumination can be achieved as indicated in FIG. 4, which is similar to FIG. 3, except that the reference wave is no longer stopped, and that an extra lens (400) must be added between the mirror (300) and the sample (109). This lens must be positioned so that its focal point coincides with the sample, and its focal distance must be such that the diffraction spot formed on the sample has about the same diameter as the observed area. A variation of this illumination method is obtained by modifying the beam orientation, which does not necessarily have to be included in the aperture cone of the microscope objective. In this latter case, the resulting two-dimensional image usually has defects, but, for some specific objects (point defects in glass), the signal-to-noise ratio is improved, and the three-dimensional image is of good quality. This method is a three-dimensional equivalent to ultramicroscopy.

In another variation of this embodiment, a single interference pattern is used to generate a three-dimensional representation. This variation is the numerical equivalent of the optical holographic reconstruction. According to this variation, the piezoelectric transducer (120) is not used. Let I(P) be the intensity of the interference figure produced, at a point P of the photosensor, by the wave originating from the object and by the reference wave. The function S(P) is now given as:

$$S(P) = \frac{I(P) - I_{ref}(P)}{\sqrt{I_{ref}(P)}}.$$

Let I[i,j] be the value, at pixel (ij), of the resulting interference pattern, where the origin of the coordinate system is the corner of the photosensor. The formulas that determine S[i,j] are modified as follows:

$$S[i, j] : \frac{I[i, j] - Iref[i, j]}{\sqrt{Iref[i, j]}}$$

imaginary part of S[i,j]: 0

The focusing point of the beam originating from the lens (121) must have its virtual image, after reflection off the beamsplitter (114), on the side of the image of the aperture of the diaphragm (112) through the achromat (113), and not at the center as indicated before. The working cycle of the microscope is modified: a single image per cycle is used instead of three, there is therefore no more action on the phase control system. The image, compared to the ratio of the wave scattered by the object to the reference wave, is affected by second order approximations. Therefore, in the normal operation of the microscope, filters (101) and (118) must be chosen so that the intensity of the reference wave, when it reaches the CCD, is notably higher than the intensity of the wave originating from the object and reaching the CCD sensor, rather than close to it as before. This choice must be made to reach, in the three-dimensional representation, the best compromise between noise and second-order distortions. Apart from that, the operation of the microscope and the computation method are as described above.

The three-dimensional representation which is generated comprises the observed part of the object, limited by the diaphragm, and its symmetric part in relation to the virtual focusing point of the beam originating from the lens (121). The aperture of the diaphragm must be sufficiently reduced so that both the aperture and its symmetric image are visible on the resulting representation. The area of the object that may be observed is smaller than in the preferred embodiment. This three-dimensional representation is also affected by second order approximations compared to the ratio of the wave scattered by the object to the reference wave, and the wave diffracted by the object must be notably lower than the reference wave in order to achieve an acceptable result. Therefore the resulting representation is notably noisier than the one resulting from the use of the preferred embodiment. However, the system is less sensitive to vibrations and renders it possible to obtain images faster.

Other embodiments exist and the above description is not restrictive.

POSSIBILITIES OF INDUSTRIAL APPLICATION

This microscope can be used instead of the standard transmission microscopes, in biology or micromeasurement. Recording of the three-dimensional image is faster than with other methods, which eases the observation of mobile samples.

What is claimed is:

1. A microscope comprising:

a laser generating a coherent optical wave, means to split said coherent optical wave into an illuminating wave which illuminates the observed object, and a reference wave, distinct from the illuminating wave, and which does not reach the observed object, means to sample and digitize the optical intensity received on a receiving surface on which an interference pattern is formed by the reference wave and the wave emanating from said object, means to determine, at each sampled point of said receiving surface, the phase and amplitude of the wave emanating from the observed object and reaching said receiving surface, a microscope objective focused on the observed part of said object, which forms an enlarged intermediate image of the plane of said object on which it is focused, means to superimpose the wave emanating from said object and having passed through said microscope objective, to the reference wave which does not pass through said microscope objective, optical devices that modify the wave emanating from said object in such a way that a plane wave emanating from the observed object and entering said microscope objective has a point image on the receiving surface, a diaphragm which spatially filters said enlarged image formed by said microscope objective.

2. A microscope as claimed in claim 1, comprising means to generate a reference wave which is the virtual image of virtual wave present in said object, said virtual wave present in said object being approximately spherical and centered into or close to the observed part of said object.

3. A microscope comprising:

a laser generating a coherent optical wave, means to split said coherent optical wave into an illuminating wave which illuminates an observed object, and a reference wave, distinct from the illuminating wave, and which does not reach said object, means to sample and digitize the optical intensity received on a receiving surface on which an interference pattern is formed by the reference wave and the wave emanating from said object, said receiving surface being placed in a Fourier plane in which a plane wave emanating from the object has a point image.

means to determine, at each sampled point of said receiving surface, the phase and amplitude of the wave emanating from said object and reaching said receiving surface, a microscope objective focused on the observed part of said object, means to superimpose the wave emanating from said object and having passed through said microscope objective, to the reference wave which does not pass through said microscope objective, means to compute, from the phase and amplitude of the wave received on said receiving surface, and for a given illuminating wave, a representation of the optical wave in the observed part of said object, consisting in a three-dimensional frequency representation, which is a decomposition into plane waves in the form of as a three-dimensional array H, in which the complex value H[i,j,k] of an array element indexed by the integers i,j,k verifies the formula $$H[i,j,\sqrt{K^2-(i-\text{icentre})^2-(j-\text{jcentre})^2}-C]=S[i,j]$$

where K, icentre, jcentre, C are constants and where S[i,j] is the complex value recorded on a point of said receiving surface having two-dimensional spatial coordinates proportional to (i,j), or any three-dimensional array that can be deduced from H[i,j,k] by oversampling or undersampling any of its indexes i,j,k.

4. A microscope as claimed in claim 3, comprising means to generate a reference wave which is the image of a virtual spherical wave centered on a point of the plane of said observed object on which the objective is focussed.

5. A microscope as claimed in claim 4, comprising optical devices that form an enlarged image of the plane of the observed object on which said microscope objective is focused, and comprising a diaphragm which spatially filters said enlarged image.

* * * * *